United States Patent
Nelson (10) Patent No.: US 12,093,070 B1
(45) Date of Patent: Sep. 17, 2024

(54) BRAKE ADJUSTMENT DEVICE

(71) Applicant: Michael E. Nelson, Jonesboro, AR (US)

(72) Inventor: Michael E. Nelson, Jonesboro, AR (US)

( * ) Notice: Subject to any disclaimer, the term of this patent is extended or adjusted under 35 U.S.C. 154(b) by 0 days.

(21) Appl. No.: 17/690,988

(22) Filed: Mar. 9, 2022

(51) Int. Cl.
  *G05G 1/405* (2008.04)
  *B60T 7/06* (2006.01)

(52) U.S. Cl.
  CPC .............. *G05G 1/405* (2013.01); *B60T 7/06* (2013.01)

(58) Field of Classification Search
  CPC ........... G05G 1/40; G05G 1/405; G05G 1/42; G05G 1/44; B60T 7/06; B60T 7/065; B60T 7/08; B60T 7/10
  See application file for complete search history.

(56) References Cited

U.S. PATENT DOCUMENTS

| | | | | |
|---|---|---|---|---|
| 2011/0154941 A1* | 6/2011 | Gibbs | ........................ | F16C 1/12 74/503 |
| 2013/0174687 A1* | 7/2013 | Gibbs | .................... | G05G 1/487 74/501.6 |
| 2014/0298944 A1* | 10/2014 | Gibbs | ..................... | B60T 7/102 74/481 |

* cited by examiner

*Primary Examiner* — Zakaria Elahmadi
(74) *Attorney, Agent, or Firm* — Schrantz Law Firm, PLLC; Stephen D. Schrantz (57) ABSTRACT

The brake adjustment device positions the brake pedal according to user customization. A base secures to the braking system of the vehicle. An adjustable arm provides two ends, a first end that attaches to the base and a second end that attaches to the brake pedal. The attachment of the base and the adjustable arm adjusts to vary the distance between the attachment end of the base and the attachment end of the adjustable arm. Increasing the distance between the attachment end of the base and the attachment end of the adjustable arm raises the brake pedal. Decreasing the distance between the attachment end of the base and the attachment end of the adjustable arm lowers the brake pedal.

20 Claims, 7 Drawing Sheets

BRAKE ADJUSTMENT DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to a brake adjustment device for adjusting the position of the brake on a vehicle. More specifically, the present invention positions the brake for use by the user of a vehicle. The present invention enables increased adjustability to customize the position of the brake for a vehicle, including but not limited to motorcycles, such as the Spyder Can-Am, and other vehicles with adjustable brake pedals.

Known systems provide fixed positions without allowing the customization of the present invention. The known systems do not allow fine tuning the position of the brake pedal.

The brake adjustment device of the present invention overcomes many disadvantages of current braking systems. The device provides an improved adjustment of the brake pedal. Therefore, the present invention is needed to provide a user with a increased customization for positioning the brake pedal.

II. Description of the Known Art

Patents and patent applications disclosing relevant information are disclosed below. These patents and patent applications are hereby expressly incorporated by reference in their entirety.

U.S. Pat. No. 9,266,507 issued to Shand on Jan. 22, 2009 (the '507 patent) teaches a brake pedal assembly for a vehicle having a brake pedal arm having an initial position and an adjustment subassembly configured to adjust the initial position. The brake pedal assembly taught by the '507 patent is further provided with a preload spring configured to provide a preload force to the brake pedal arm and a preload adjustment cam in cooperation with the brake pedal arm. The adjustment subassembly and the preload spring taught by the '507 patent are configured to change the preload force in response to a change in the initial position.

SUMMARY OF THE INVENTION

The brake adjustment device of the present invention positions the brake pedal according to user customization. The brake adjustment device positions the brake pedal at different locations for use. A base secures to the braking system of the vehicle. In one embodiment, the base secures to the master cylinder.

An adjustable arm provides two ends, a first end that attaches to the base and a second end that attaches to the brake pedal. The attachment of the base and the adjustable arm adjusts to vary the distance between the attachment end of the base and the attachment end of the adjustable arm. Increasing the distance between the attachment end of the base and the attachment end of the adjustable arm raises the brake pedal. Decreasing the distance between the attachment end of the base and the attachment end of the adjustable arm lowers the brake pedal.

A protective covering, such as a tube, heat shrink or other wrap, installs across the attachment of the base and the adjustable arm. The tube is heated to shrink the tube (wrap) around the attachment of the base with the adjustable arm. The tube limits the exposure of the attachment of the base with the adjustable arm to the elements.

Accordingly, it is an object of the present invention to adjust the position of the brake pedal in relation to the user.

It is another object of the present invention to raise the brake pedal.

It is another object of the present invention to lower the brake pedal.

It is another object of the present invention to vary the distance between the attachment ends of the base and the adjustable arm to adjust the positioning of the brake pedal.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views?

DETAILED DESCRIPTION

Figure 1:
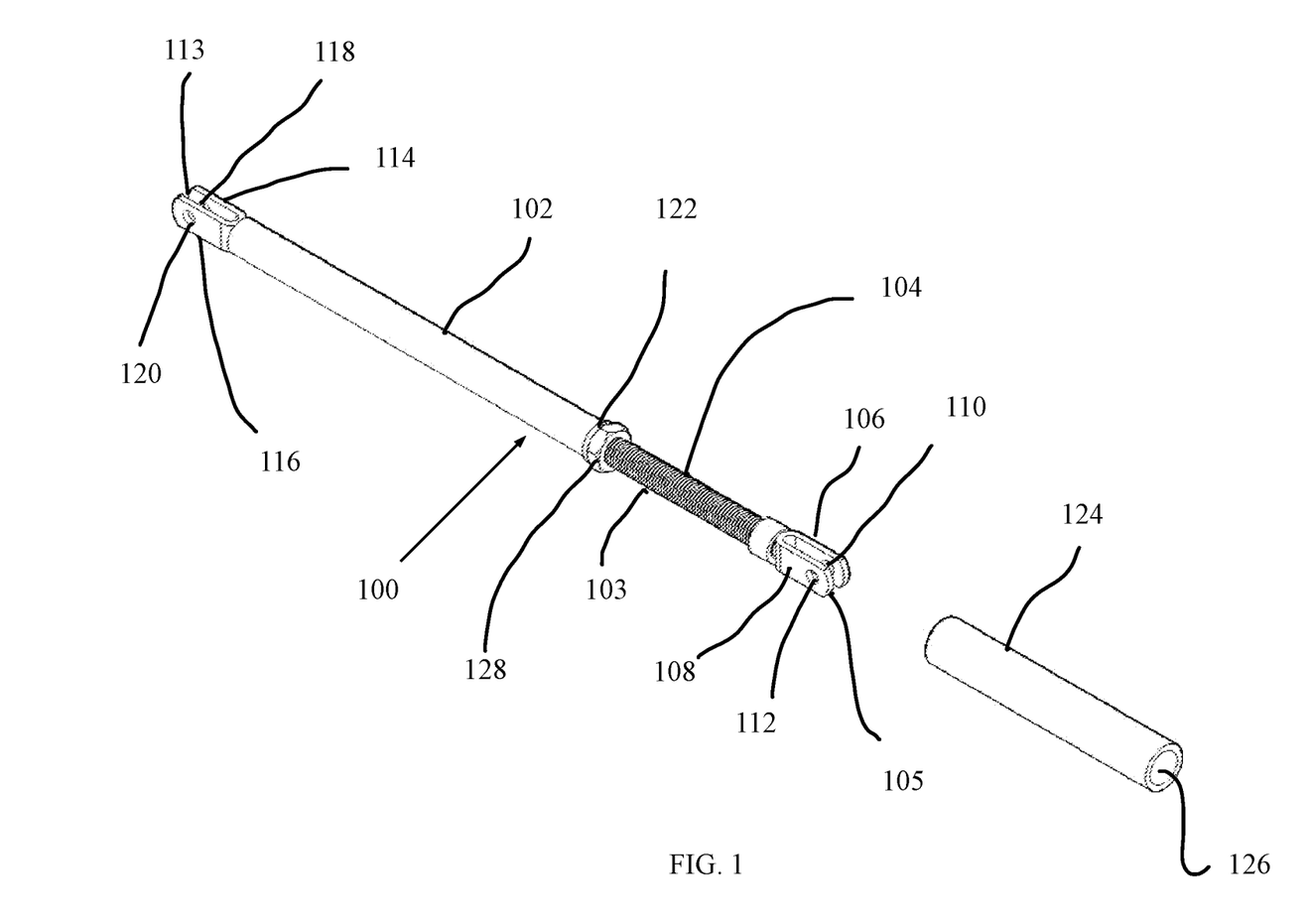
FIG. 1 is a top perspective view of one embodiment of the present invention.
Figure 9:
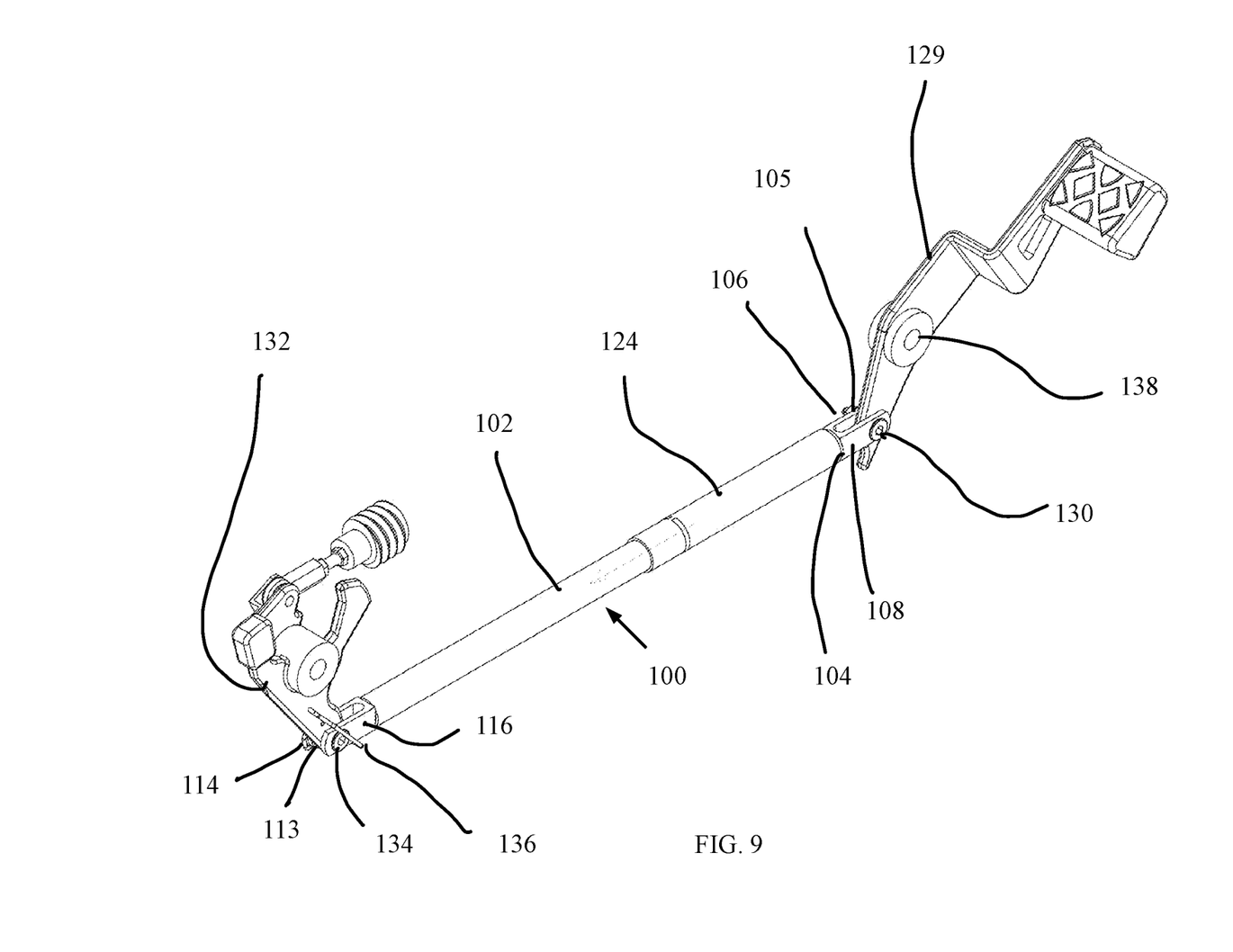
FIG. 9 is a brake adjustment device of one embodiment of the present invention.

The brake adjustment device 100 of the present invention adjusts the positioning of a brake pedal 129 as shown in FIGS. 1 and 9. The device 100 provides attachment ends 105, 113 for securing to the braking system 132 of the vehicle and the brake pedal 129.

The brake adjustment device 100 positions the brake pedal 129 according to user customization. The brake adjustment device 100 positions the brake pedal 129 at different locations for use. The positioning of the brake pedal 129 varies according to the distance between the attachment ends 105, 113. Increasing the distance between the attachment ends 105, 113 raises the brake pedal 129. Decreasing the distance between the attachment ends 105, 113 lowers the brake pedal 129.

Continuing to refer to FIG. 1, base 102 provides attachment end 113 with attachment arms 114, 116 having attachment apertures 118, 120. Attachment arms 114, 116 at the attachment end 113 secure the base 102 to the braking system 132. In one embodiment, attachment end 113 secures to the master cylinder of the braking system. The attachment apertures 118, 120 accept a fastener to secure attachment end 113 to the braking system.

The base 102 also provides an adjustment end 122 that secures to the adjustable arm 104 with threads 103. The base 102 provides an opening in the adjustment end 122 with a threaded receiver for securing the adjustable arm 104 with the base 102. The threads 103 adjust the length of the adjustable arm 104 extending longitudinally from the adjustment end 122. At the desired length, the user tightens nut 128 to limit movement of the adjustable arm 104 in relation to the base 102.

The adjustable arm 104 provides an attachment end 105 with attachment arms 106, 108 having attachment apertures 110, 112. Attachment end 105 secures to the brake pedal 129. A fastener inserts into attachment apertures 110, 112 to secure the attachment end 105 to the brake pedal 129.

After adjusting the adjustable arm 104 and the brake pedal 129 to the proper position, the user tightens nut 128. The protective covering 124 is installed over the threads 103 of adjustable arm 104, the nut 128, and a portion of the base 102. The protective covering 124 provides opening 126 in which the adjustable arm 104 and base 102 are inserted. The protective covering 124 of one embodiment is a tube, heat shrink or other wrap that installs across the attachment of the base and the adjustable arm. The protective covering 124 is heated to shrink the protective covering 124 around the attachment of the base 102 with the adjustable arm 104. The protective covering 124 limits the exposure of the attachment of the base 102 with the adjustable arm 104 to the elements.

Figure 2:
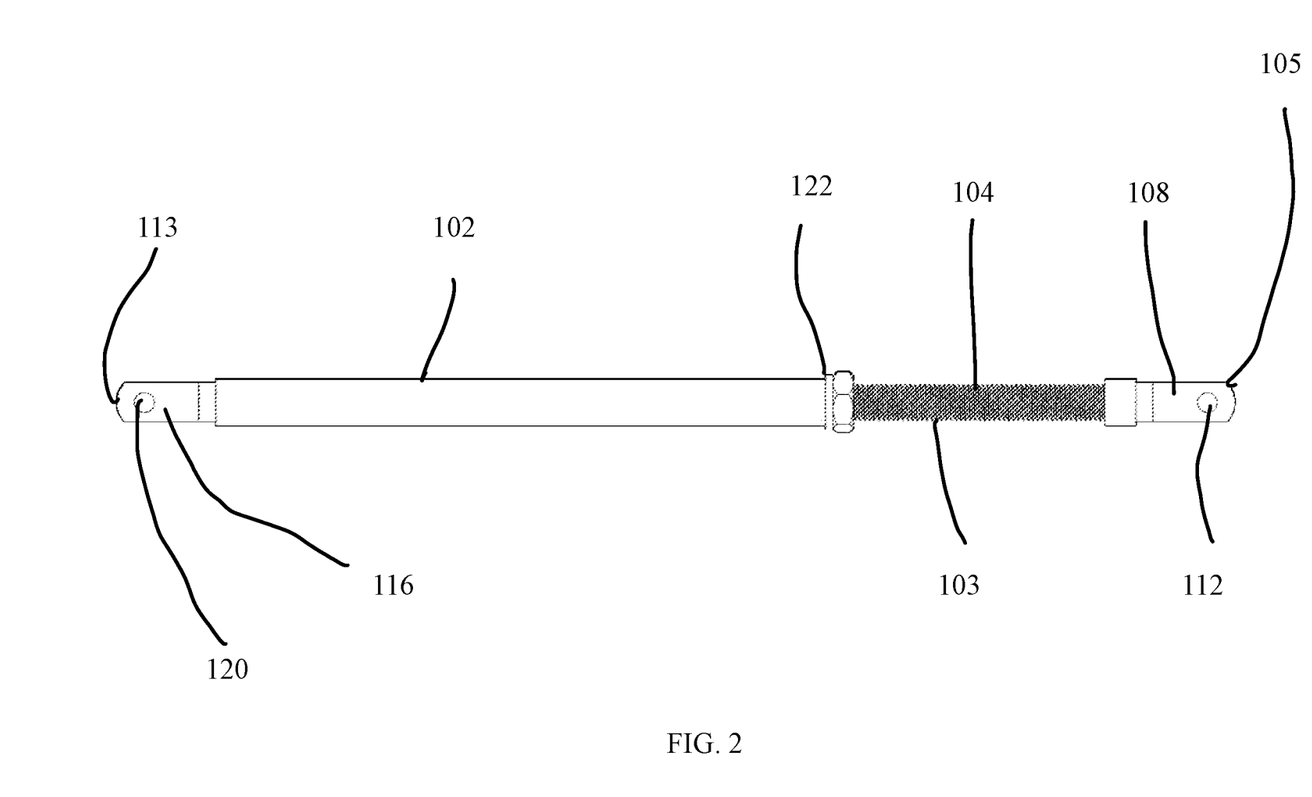
FIG. 2 is a front view thereof.
Figure 3:
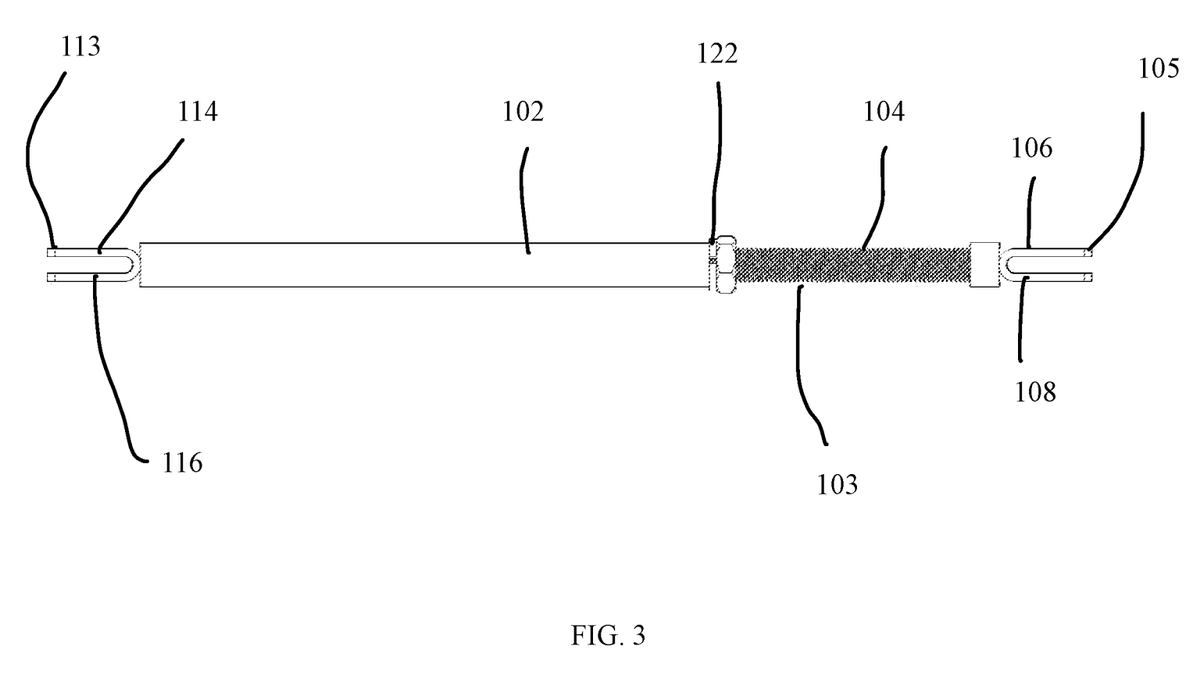
FIG. 3 is a top view thereof.

FIGS. 2 and 3 show the base 102 attached to the adjustable arm 104. The attachment end 113 of base 102 provides attachment arms 114, 116 for securing the base 102 to the braking system. In one embodiment, a clevis is secured at the attachment end 113 to provide attachment arms 114, 116. The attachment end 105 of adjustable arm 104 provides attachment arms 106, 108 for securing the adjustable arm 104 to the brake pedal. In one embodiment, a clevis is secured at the attachment end 105 to provide attachment arms 106, 108.

The threads 103 allow adjustment of adjustable arm 104 in relation to the base 102. Rotation of the base 102 in relation to the adjustable arm 104 adjusts the longitudinal distance between the attachment ends 105, 113. The user then tightens the nut 122 against the base 102 to limit rotation of the base 102 with the adjustable arm 104. The nut 122 also limits movement and rotation of the attachment arms 106, 108, 114, 116 and the attachment apertures 112, 120.

Figure 4:
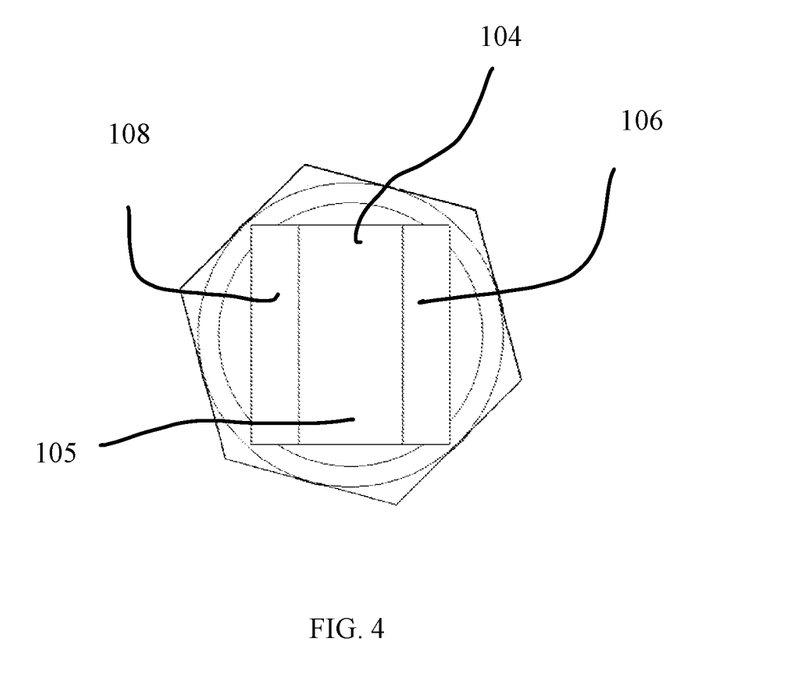
FIG. 4 is a right side view thereof.

FIG. 4 shows the attachment end 105 of the adjustable arm 104. The brake pedal secures to the adjustable arm 104 at an opening between the attachment arms 106, 108. A portion of the brake pedal inserts into the opening between the attachment arms 106, 108, such as at the clevis. A fastener secures the brake pedal within the opening between the attachment arms 106, 108.

Figure 5:
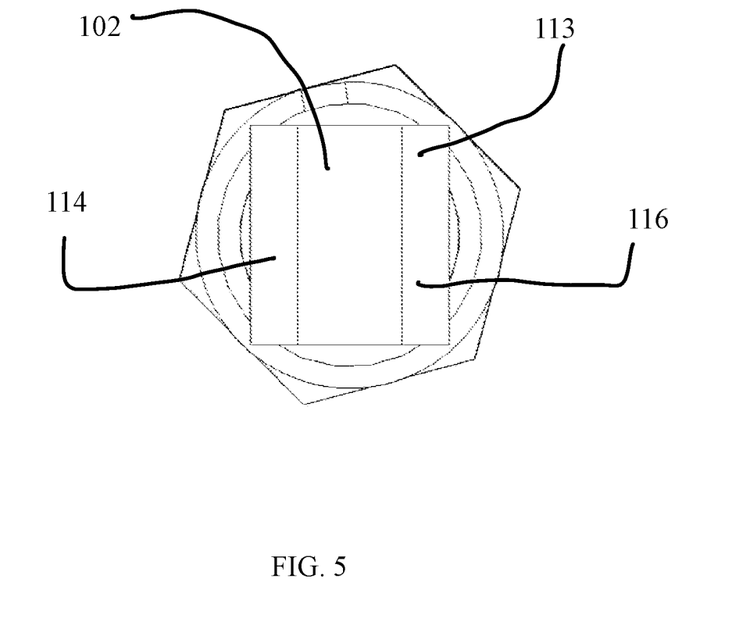
FIG. 5 is a left side view thereof.

FIG. 5 shows the attachment end 113 of the base 102. The braking system secures to the base 102 at an opening between the attachment arms 114, 116. A portion of the braking system inserts into the opening between the attachment arms 114, 116, such as at the clevis. A fastener secures a connection to the master cylinder of the braking system within the opening between the attachment arms 114, 116.

Figure 6:
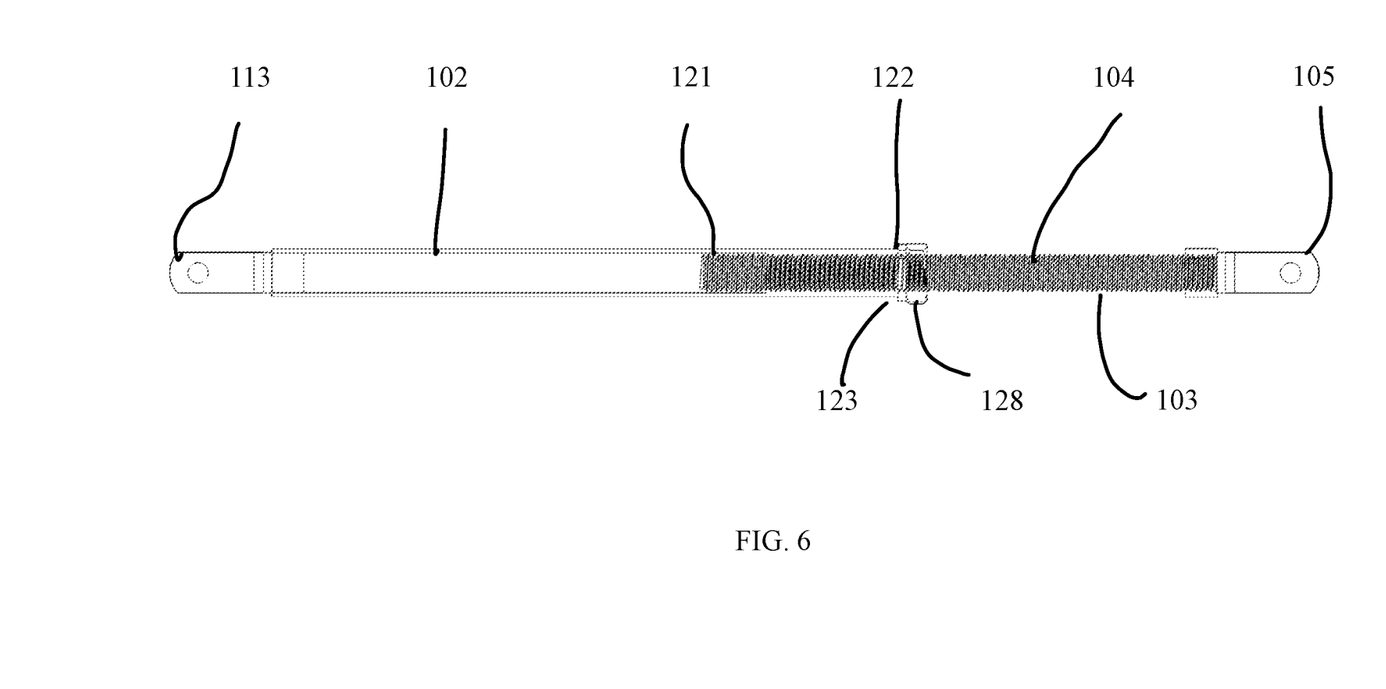
FIG. 6 is a sectional view thereof.

FIG. 6 shows a sectional view of the base 102 secured to the adjustable arm 104. Threads 103 secure the adjustable arm 104 to the base 102. The base 102 provides a receiving aperture 123 at the adjustment end 122. The threaded receiver 121 is located within the receiving aperture 123. Threads 103 secures the adjustable arm 104 to the base 102 at the threaded receiver 121.

The length of the threaded receiver 121 defines the amount of adjustment available for positioning the brake pedal. The user rotates the adjustable arm 104 in relation to the base 102 to adjust the distance, such as the longitudinal distance, between the attachment ends 105, 113. The connection of the adjustable arm 104 within the threaded receiver 121 of the base 102 adjusts the position of the brake pedal.

Figure 7:
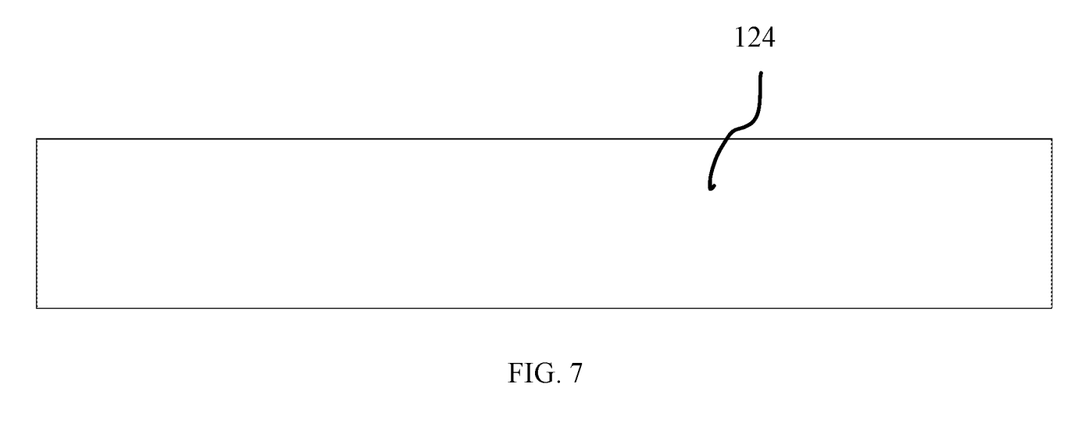
FIG. 7 is a front view of the protecting covering of one embodiment of the present invention.
Figure 8:
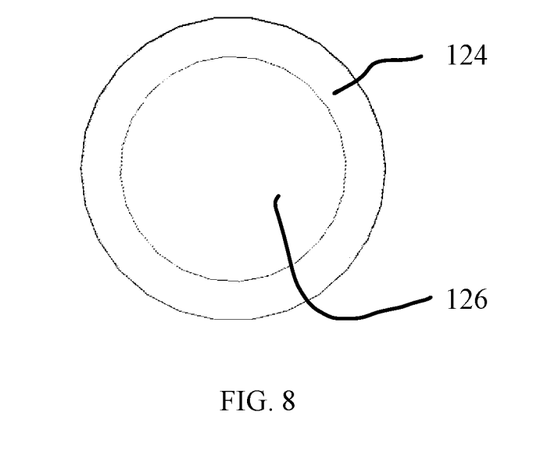
FIG. 8 is a right side view thereof.

FIGS. 7 and 8 show the protective covering 124 that covers the nut and at least a portion of the adjustable arm and the base. The protective covering of one embodiment is a tube, heat shrink or other wrap. The protective covering 124 includes an opening 126 in which the nut and at least a portion of the base and the adjustable arm are inserted into. The protective covering 124 of one embodiment that is a heat shrink is then heated to secure around the nut and the attachment of the base to the adjustable arm.

FIG. 9 shows an environmental view of the brake adjustment device 100. The base 102 secures to the braking system 132. The attachment end 113 of the base 103 secures to the master cylinder of the braking system 132. Attachment fingers 114, 116 secure around the braking system 132. Fastener 134 secures the braking system 132 to the attachment fingers 114, 116, such as a clevis, of the base 102. Fastener 136, such as a pin, also secures the braking system 132 with the base 102.

Protective covering 124 covers the nut and at least a portion of the base 102 and the adjustable arm 106. Attachment end 105 of the adjustable arm 104 secures to the brake pedal 129. Attachment fingers 106, 108, such as a clevis, attach to the brake pedal 129. Fastener 130 secures the brake pedal 129 to the attachment fingers 106, 108, such as a clevis. In one embodiment, the attachment end 105 secures to the brake pedal 129 to a first side of the pivot 138 opposite of the pedal.

The attachment of the base 102 and the adjustable arm 104 adjusts to vary the distance between the attachment end 113 of the base 102 and the attachment end 105 of the adjustable arm 104. Increasing the distance between the attachment end 113 of the base 102 and the attachment end 105 of the adjustable arm 106 raises the brake pedal 129. Decreasing the distance between the attachment end 113 of the base 102 and the attachment end 105 of the adjustable arm 106 lowers the brake pedal 129.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A brake adjustment device for adjusting a position of a brake pedal connected to a braking system of a motorized vehicle:
 a base extending longitudinally, wherein the base has a first longitudinal end and a second longitudinal end, wherein the first longitudinal end is located opposite the second longitudinal end, the base configured to attach to the braking system;
 an attachment finger of the base configured to attach to the braking system;
 a threaded receiver located at the second longitudinal end of the base, wherein the attachment finger of the base maintains a fixed distance from the threaded receiver;
 an adjustable arm configured to secure to the brake pedal, wherein the adjustable arm attaches to the base;
 an attachment finger of the adjustable arm configured to secure to the brake pedal;
 a threaded end of the adjustable arm that secures to the threaded receiver of the base, wherein the attachment finger of the adjustable arm maintains a fixed distance from the threaded end of the adjustable arm;
 wherein the adjustable arm adjustably attaches to the base at the threaded receiver to adjust a distance between the attachment finger of the base and the attachment finger of the adjustable arm.

2. The device of claim 1 wherein the adjustable arm rotates in relation to the base to secure the adjustable arm to the threaded receiver within the base.

3. The device of claim 1 further comprising:
 a receiving aperture within the base at the second longitudinal end, wherein the threaded end of the adjustable arm secures to the threaded receiver within the receiving aperture to secure the adjustable arm to the base;
 wherein the attachment finger of the base remains fixed in relation to the attachment finger of the adjustable arm when secured to the braking system.

4. The device of claim 1,
 wherein the attachment finger attaches to the brake pedal.

5. The device of claim 1,
 wherein the attachment finger attaches to the braking system, wherein the attachment finger remains a fixed distance from the second longitudinal end of the base.

6. The device of claim 4, wherein the attachment finger is a clevis.

7. The device of claim 5, wherein the attachment finger is a clevis.

8. The device of claim 4 further comprising:
 a fastener that secures the attachment finger to the brake pedal.

9. The device of claim 5 further comprising:
 a fastener that secures the attachment finger to a master cylinder of the braking system.

10. The device of claim 3 further comprising:
 a nut secured to the adjustable arm that tightens against the base to limit rotation of the adjustable arm in relation to the base.

11. A brake adjustment device for adjusting a position of a brake pedal connected to a braking system of a motorized vehicle:
 a base extending longitudinally, wherein the base has a first longitudinal end and a second longitudinal end, wherein the first longitudinal end is located opposite the second longitudinal end, the base configured to attach to a master cylinder of the braking system;
 an attachment finger secured at the first longitudinal end of the base, the attachment finger configured to attach to the master cylinder of the braking system;
 a threaded receiver located at the second longitudinal end of the base;
 an adjustable arm having a first longitudinal end and a second longitudinal end, the adjustable arm configured to secure to the brake pedal, wherein the adjustable arm attaches to the base, wherein the base and the adjustable arm extend longitudinally;
 an attachment finger located at the first longitudinal end of the adjustable arm configured to secure to the brake pedal;
 a threaded end located at the second longitudinal end of the adjustable arm that secures to the threaded receiver of the base;
 wherein the adjustable arm adjustably attaches to the base to adjust a longitudinal distance between the attachment finger of the base and the attachment finger of the adjustable arm, wherein the adjustable arm also attaches to the base to maintain a fixed distance between the attachment finger of the base and the attachment finger of the adjustable arm.

12. The device of claim 11 wherein the adjustable arm rotates in relation to the base to secure the adjustable arm to the base.

13. The device of claim 11,
 wherein the threaded receiver is located within a receiving aperture within the base located longitudinally opposite the attachment finger of the base, wherein the threaded end of the adjustable arm secures to the threaded receiver of the base to secure the adjustable arm to the base.

14. The device of claim 11,
 wherein the attachment finger of the adjustable arm attaches to the brake pedal, wherein the attachment finger of the adjustable arm accepts a fastener inserted laterally through the attachment finger of the adjustable arm to secure the adjustable arm to the brake pedal.

15. The device of claim 11,
 wherein the attachment finger of the base attaches to the master cylinder of the braking system, wherein the attachment finger of the base accepts a fastener inserted laterally through the attachment finger of the base to secure the base to the master cylinder of the braking system.

16. The device of claim 14,
 wherein the attachment finger of the base attaches directly to the master cylinder of the braking system, wherein the attachment finger of the base accepts a fastener inserted laterally through the attachment finger of the base to secure the base directly to the master cylinder of the braking system;
 wherein the attachment finger of the base is a clevis; and
 wherein the attachment finger of the adjustable arm is a clevis.

17. The device of claim 16 further comprising:
a nut secured to the threaded end of the adjustable arm that tightens against the base to limit rotation of the adjustable arm within the threaded aperture of the base, wherein the nut attached to the threaded end and tightened against the base maintains a fixed distance between the attachment finger of the adjustable arm and the attachment finger of the base.

18. A brake adjustment device for adjusting a position of a brake pedal connected to a braking system of a motorized vehicle:
a base extending longitudinally, wherein the base has a first longitudinal end and a second longitudinal end, wherein the first longitudinal end is located opposite the second longitudinal end, the base configured to attach to a master cylinder of the braking system;
an adjustable arm extending longitudinally, wherein the adjustable arm has a first longitudinal end and a second longitudinal end, the adjustable arm configured to secure to the brake pedal, wherein the adjustable arm attaches to the base, wherein the base secured to the adjustable arm extends longitudinally;
an attachment finger of the base configured to directly attach to the master cylinder of the braking system, wherein the attachment finger is located at the first longitudinal end of the base;
a threaded receiver within the second longitudinal end of the base that receives a threaded end of the adjustable arm for securing the adjustable arm to the base;
wherein the threaded end of the adjustable arm is located at a first longitudinal end of the adjustable arm;
an attachment finger located at the second longitudinal end of the adjustable arm, wherein the attachment finger of the adjustable arm is configured to secure to the brake pedal;
wherein the threaded end of the adjustable arm adjustably attaches to the threaded receiver of the base to adjust a longitudinal distance between the attachment finger of the base and the attachment finger of the adjustable arm to adjust a location of the brake pedal in relation to the master cylinder of the braking system;
a nut secured to the threaded end of the adjustable arm that tightens against the second longitudinal end of the base to maintain a fixed longitudinal distance between the attachment finger of the adjustable arm and the attachment finger of the base, wherein the fixed longitudinal distance defines the location of the brake pedal in relation to the master cylinder.

19. The device of claim 18,
wherein the threaded receiver is located within a receiving aperture at the second longitudinal end of the base, wherein the threaded end of the adjustable arm secures to the threaded receiver within the base to secure the adjustable arm to the base;
wherein the adjustable arm rotates in relation to the base to secure the adjustable arm to the base, wherein rotation of the adjustable arm in relation to the base within the threaded receiver adjusts the longitudinal distance between the attachment finger of the base and the attachment finger of the adjustable arm;
wherein the nut secured to the threaded end of the adjustable arm tightens against the second longitudinal end of the base to limit rotation of the adjustable arm in relation to the base and maintains the fixed longitudinal distance between the attachment finger of the base and the attachment finger of the adjustable arm.

20. The system of claim 18, wherein decreasing the fixed longitudinal distance between the attachment finger of the base and the attachment finger of the adjustable arm lowers the location of the brake pedal without applying the brakes;
wherein increasing the fixed longitudinal distance between the attachment finger of the base and the attachment finger of the adjustable arm raises the location of the brake pedal.

* * * * *